United States Patent [19]

Speit et al.

[11] Patent Number: 5,173,212
[45] Date of Patent: Dec. 22, 1992

[54] ALUMINOPHOSPHATE GLASS CONTAINING COPPER(II) OXIDE

[75] Inventors: Burkhard Speit, Mainz; Ansgar Karnehm, Saulheim; Magdalena Winkler-Trudewig, Mainz, all of Fed. Rep. of Germany

[73] Assignee: Schott Glaswerke, Mainz, Fed. Rep. of Germany

[21] Appl. No.: 773,010

[22] Filed: Oct. 4, 1991

[30] Foreign Application Priority Data

Oct. 5, 1990 [DE] Fed. Rep. of Germany ....... 4031469

[51] Int. Cl.$^5$ ............ C09K 11/08; G02B 5/22; C03C 3/16; C03C 3/17
[52] U.S. Cl. .............. 252/301.4 P; 252/301.6 P; 252/582; 252/587; 501/41; 501/45; 501/48; 501/73; 501/904; 501/905
[58] Field of Search .......... 501/41, 44, 45, 47, 501/48, 904, 905; 252/301.4 P, 301.6 P, 582, 587

[56] References Cited

U.S. PATENT DOCUMENTS

| | | | |
|---|---|---|---|
| 4,105,577 | 8/1978 | Yamashita | 252/300 |
| 4,217,382 | 8/1980 | Toratani | 428/66 |
| 4,229,220 | 10/1980 | Hirota | 501/46 |
| 4,303,298 | 12/1981 | Yamashita | 350/1.1 |
| 4,615,989 | 10/1986 | Ritze | 501/44 |
| 4,929,387 | 5/1990 | Hayden et al. | 252/301.4 P |

FOREIGN PATENT DOCUMENTS

0153202 12/1981 Fed. Rep. of Germany ...... 501/904

Primary Examiner—Mark L. Bell
Assistant Examiner—Michael Marcheschi
Attorney, Agent, or Firm—Millen, White, Zelano and Branigan

[57] ABSTRACT

An aluminophosphate glass containing copper(II) oxide having a low transmission in the near infrared range with a steep absorption edge as well as a very uniform high transparency in the visible range is particularly suitable as filter glass for color video cameras or as filter glass, e.g., for goggles and color displays, said glass comprising, in % by weight on the oxide basis, 67–77 of $P_2O_5$; 8–13 of $Al_2O_3$; 0–5.5 of $B_2O_3$; 0–2.1 of $SiO_2$; 0–2.5 of $Li_2O$; 0–6 of $Na_2O$; 0–14 of $K_2O$; 0–2.5 of $Rb_2O$; 0–2.5 of $Cs_2O$; Σ alkali metal oxide 3–14; 2.5–4.9 of MgO; 0–2.5 of CaO; 0–2.5 of SrO; 0–2.5 of BaO; 0–2.5 of ZnO; Σ alkaline-earth metal oxides + ZnO less than 5; 2–7.5 of CuO; 0.001–0.5 of $V_2O_5$; CuO + $V_2O_5$ of 2–7.5.

20 Claims, No Drawings

ALUMINOPHOSPHATE GLASS CONTAINING COPPER(II) OXIDE

BACKGROUND OF THE INVENTION

This invention relates to glasses having low transmission in the infrared range, and in particular to aluminophosphate glasses containing copper(II) oxide.

Such glasses are used, e.g., as color correction filters in color video cameras, as shields for illuminated color displays (e.g., in aircraft cockpits), as stray light filters in monochromators, as graduated filters, as an inorganic component in plastic composite filters or as goggles.

The glasses should have as high a transparency as possible in the near UV range and in the visible range of light (about 400–625 nm) and as low as possible a transparency in the infrared range (above about 625 nm). In this case, the glass is largely color-neutral. The weathering resistance must be sufficient to ensure that the spectral transmission characteristic remains unchanged in humid air. A low thermal expansion is also necessary, especially for the industrial production of large-surface filters.

A large number of such glasses have already been described. In DE 29 08 697 B2, a glass with a high barium content is described, but in which the $Al_2O_3$ content has to be kept low, which thereby has a negative effect on the weathering resistance. DE 32 29 442 A1 describes a phosphate glass on the basis of $P_2O_5/Sb_2O_3$/alkaline-earth oxygen+zinc oxide. The high content of $Sb_2O_3$ and alkaline-earth oxides has the disadvantage that, caused by the high index of refraction of these glasses, sizable light losses due to scattering must be accepted in areas where the filters meet. Moreover the weathering resistance is drastically reduced by the alkaline-earth metal oxides SrO and BaO.

JP-PS 59 15 102, JP-OS 60 23 57 40 and JP-PS 61 59 256 also describe glasses having high contents of alkaline-earth metal oxides (+ZnO). In the first two mentioned Japanese patents, the $B_2O_3$ portion is relatively low, which leads to an increased transformation temperature (Tg). Such glasses having a great viscosity change in a narrow temperature range can be produced only with difficulty.

JP-OS 62 15 3144 and JP-OS 62 12 89 43 describe glasses free of alkali metal, which are not easy to melt. Finally, JP-OS 57 149 845 and JP-OS 63 25 245 describe phosphate glasses, which contain a content of $Fe_2O_3$ or $SnO_2$.

Although, as is evident, numerous CuO-containing phosphate glasses already exist, there is still a demand for improved glasses.

SUMMARY OF THE INVENTION

An object of the invention therefore is to provide an IR-absorbing glass having steep absorption edge in the near infrared range, a low thermal expansion and good weathering resistance, which, moreover, has a very uniform high transmission in the transparent range for near-UV and visible light.

Another object is to provide articles of manufacture embodying such glasses.

Upon further study of the specification and appended claims, further objects and advantages of this invention will become apparent to those skilled in the art.

To attain these objects, there is provided an aluminophosphate glass having a low transmission in the infrared range, comprising in % by weight on an oxide basis, of

| | | | |
|---|---|---|---|
| $P_2O_5$ | 67–77 | MgO | 2.5–4.9 |
| $Al_2O_3$ | 8–13 | CaO | 0–2.5 |
| $B_2O_3$ | 0–5.5 | SrO | 0–2.5 |
| $SiO_2$ | 0–2.1 | BaO | 0–2.5 |
| $Li_2O$ | 0–2.5 | ZnO | 0–2.5 |
| $Na_2O$ | 0–6 | $\Sigma RO$ | <5 |
| $K_2O$ | 0–14 | CuO | 2–7.5 |
| $Rb_2O$ | 0–2.5 | $V_2O_5$ | 0.001–0.5 |
| $Cs_2O$ | 0–2.5 | $\Sigma CuO + V_2O_5$ | 2–7.5 |
| $\Sigma R_2O$ | 0–14 | | | wherein $\Sigma R_2O$ is the sum of all alkali metal oxides and $\Sigma RO$ is the sum of ZnO and all alkaline earth metal oxides.

The glass contains 67 to 77% by weight of $P_2O_5$, preferably 69 to 75% by weight. At the upper limit of this range the weathering resistance begins to decrease; at the lower limit, the transparent range for UV light is narrowed.

As another important component the glass contains 8–13% by weight of $Al_2O_3$, wherein $Al_2O_3$ improves the weathering resistance, it causes, as such, a high melting temperature to be used during the glass production, which in Cu-colored phosphate glasses shifts the ratio of $Cu^{++}$ (blue, IR absorption) to $Cu^+$ (red, UV absorption) in favor of the $Cu^+$ and thus impairs the suitability of the glass as an infrared filter. However, by the carefully coordinated addition of alkali metal oxides ($R_2O$) as well as of alkaline-earth metal oxides and zinc (RO) in combination with $B_2O_3$, it is possible to lower the melting temperature of the basic glass to such an extent that this deleterious effect no longer The total alkali metal oxide content is between 3 and 14% by weight, and the alkali metal oxides $Li_2O$, $Rb_2O$ and $Cs_2O$ can be present in the glass in amounts of up to 2.5% by weight each, and $Na_2O$ and $K_2O$ in amounts of up to 6% by weight and up to 14% by weight, respectively. Because of cost considerations, $Li_2O$, $Rb_2O$ and $Cs_2O$ are generally used only in small amounts if at all, since with merely the two low-cost oxides $Na_2O$ and $K_2O$ by themselves, satisfactory results can be obtained. A preferred range for the content of $K_2O$ is between 0.2 and 13% by weight, since, on the one hand, a content of $K_2O$ beneficially affects the melting behavior, but, on the other hand, very high $K_2O$ content leads to an increase in the coefficient of thermal expansion.

The total content of alkaline-earth oxides plus zinc oxide is under 5% by weight, to obtain, on the one hand, a adequate meltability of the glass and, on the other hand, good optical properties (a sharp absorption edge). In this case the alkaline-earth metal content is essentially determined by MgO, which can be present in the glass in amounts of 2.5 to 4.9% by weight. This means that in practice, that MgO can represent the total content of RO. A content of MgO of 2.8 to 4.8% by weight is preferred. The other alkaline-earth oxides and zinc oxides can be present in amounts of up to 2.5% by weight. But a CaO content of up to 2% by weight, an SrO content of up to 1.5% by weight, a BaO content of up to 2.2% by weight and a ZnO content of up to 1.5% by weight are preferred.

The glass can further contain up to 2% by weight of $SiO_2$. The desired sharp absorption with a steep absorption edge in the infrared range and the weathering resistance are beneficially affected by SiO$_2$. Consequently, SiO$_2$ contents of 0.5 to 2% by weight are preferred.

The CuO content of up to 7.5% by weight, especially of 2.1 to 6.5% by weight, is essential for the absorption in the infrared range. Further, an addition of 0.001 to 0.5% by weight of V$_2$O$_5$ affects the steepness of the absorption edge in the IR extremely beneficially and therefore represents an essential aspect of the invention. Since with high V$_2$O$_5$ contents, an absorption can occur in the visible region, an addition of 0.001 to 0.1% by weight, especially of 0.001 to 0.05% by weight of V$_2$O$_5$ is preferred. However, the total amount of CuO and V$_2$O$_5$ is not to exceed 7.5% by weight.

For the absorption in the infrared range, the presence of copper ions in the +2 valence state and of vanadium ions in the +5 valence state is decisive. Therefore, the glass is preferably melted in a way known in the art under oxidizing conditions. This can be achieved, e.g., by the addition of nitrates to the batch. Good results are obtained by incorporating amounts of up to 5.5% by weight of NO$_3$ ions, especially 1.5 to 5.5% by weight of NO$_3$ ions, relative to the finished glass. For stabilization of the oxidation steps, it is preferred for the glass to contain oxidation agents such as MnO$_2$, Cr$_2$O$_3$ or CeO$_2$. The addition of CeO$_2$ is preferred, since in this way, a frequently desired absorption in the near UV range can be achieved. CeO$_2$ can be present in the glass in amounts of up to 3% by weight, preferably in amounts of 0.05 to 2.5% by weight, MnO$_2$ in amounts of up to 3% by weight, preferably in amounts of up to 1% by weight, and Cr$_2$O$_3$ in amounts of up 0.5% by weight, preferably of up to 0.1% by weight. Since Cr$_2$O$_3$ causes absorption in the visible range of the spectrum, it is used only in only rare cases. The total amount of the oxidation agents CeO$_2$, MnO$_2$ and Cr$_2$O$_3$ is not to exceed 5.5% by weight, and a total content of not more than 3% by weight is preferred.

If necessary, the glass can be fined with usual fining agents, e.g., As$_2$O$_3$, Sb$_2$O$_3$, halogen such as F or Cl, or SO$_3$. But in this case, the fining agents must not deleteriously influence the equilibrium between the higher valent and lower valent state in ions, which can occur in several oxidation steps, e.g., Cu, Ce and V ions, in the direction of the lower valent state. This is especially the case when halogen (Cl or F) or Sb$_2$O$_3$ is used in the fining. The concentration of the coloring ions, the oxidation agents and fining agents therefore is to be coordinated to achieve optimal results, which can be conducted routinely by some simple test melts.

Normally favorable results are achieved by using As$_2$O$_3$, Sb$_2$O$_3$ and SO$_3$ in amounts of 0.3% by weight each and of halide (Cl, F)in amounts of up to 0.5% by weight, but the added amount of fining agents is not to exceed a total of 0.8% by weight, and normally, an amount of at most 0.5% by weight is sufficient. Further, fining with As$_2$O$_3$ alone or in combination with other fining agents is preferred. But it is to be pointed out that CeO$_2$ is a known fining agent, so that if the latter is present, it also functions as a fining agent.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application Federal Republic of Germany P 40 31 469.3-45, filed Oct. 5, 1990, are hereby incorporated by reference.

EXAMPLE 8 glasses were melted, having compositions tabulated in by weight on an oxide basis in the table. The transmission $\tau$ (including reflection losses) was measured on 1 mm thick specimens at 400 nm, 550 nm and 650 nm. Further, the expansion coefficient $\alpha 200-300 \cdot 10^7 \cdot K^{-1}$ was indicated for the range 20°-300° C. To determine weathering resistance $\Delta\tau$, specimens of 1 mm thickeners were stored for 20 days at 40° C. and a relative humidity of 90%; the transmission was measured at 400 nm before and after storage. The percentage deviation of the two transmission values from one another, measured before and after the storage, is a measurement of the weathering resistance. Example 8 is a comparison example, which shows that a self-coloring of the glass can occur when exceeding the total value of 7.5% by weight for the CuO+V$_2$O$_5$ contents.

TABLE 1

| | Example No. | | | | | | | |
|---|---|---|---|---|---|---|---|---|
| | 1 | 2 | 3 | 4 | 5 | 6 | 7 | 8 |
| P$_2$O$_5$ | 70.745 | 69.00 | 68.85 | 67.07 | 67.10 | 67.03 | 76.4 | 67.00 |
| Al$_2$O$_3$ | 11.0 | 13.0 | 9.0 | 8.6 | 13.0 | 10.5 | 7.7 | 9.0 |
| B$_2$O$_3$ | 4.5 | 4.05 | 4.0 | 3.8 | 5.5 | 4.5 | — | 4.5 |
| Li$_2$O | — | — | — | — | 2.5 | — | — | — |
| Na$_2$O | 0.9 | 0.8 | — | — | 1.5 | 4.0 | 2.8 | 6.0 |
| K$_2$O | 3.1 | 3.4 | 11.0 | 14.0 | 0.8 | — | 0.2 | 0.3 |
| MgO | 2.8 | 2.8 | 4.5 | 2.8 | 2.8 | 3.2 | 2.7 | 2.8 |
| CaO | 2.0 | — | — | — | 0.2 | — | 0.2 | — |
| SrO | — | — | — | — | 1.5 | — | — | — |
| BaO | — | 2.2 | — | — | — | — | 0.6 | — |
| ZnO | 0.1 | — | — | — | — | 1.5 | 0.6 | — |
| CuO | 2.1 | 2.1 | 2.4 | 2.4 | 3.8 | 4.4 | 5.5 | 7.5 |
| V$_2$O$_5$ | 0.005 | 0.05 | 0.005 | 0.03 | 0.01 | 0.02 | 0.025 | 0.1 |
| CeO$_2$ | 0.1 | 0.5 | 0.1 | 0.5 | 1.1 | 2.5 | 1.8 | 1.8 |
| MnO$_2$ | 0.25 | 1.10 | — | 0.5 | 0.04 | 0.2 | — | 0.2 |
| Cr$_2$O$_3$ | — | 0.05 | — | — | — | 0.1 | — | — |
| As$_2$O$_3$ | 0.3 | — | 0.15 | — | 0.05 | — | 0.14 | 0.05 |
| Sb$_2$O$_3$ | — | — | — | 0.3 | — | — | — | — |
| SO$_3$ | 0.1 | 0.3 | — | — | — | 0.3 | — | — |
| Cl | — | — | — | — | 0.1 | 0.05 | — | 0.2 |
| SiO$_2$ | — | 2.0 | 0.20 | — | — | 1.4 | 1.2 | 0.35 |

TABLE 1-continued

| | Example No. | | | | | | | |
|---|---|---|---|---|---|---|---|---|
| | 1 | 2 | 3 | 4 | 5 | 6 | 7 | 8 |
| F | — | 0.50 | — | — | — | 0.30 | 0.14 | 0.20 |
| τ* 400 nm, 1 mm | 85.2 | 83.9 | 85.0 | 86.2 | 79.8 | 77.2 | 72.5 | 51.2 |
| τ 550 nm, 1 mm | 85.1 | 86.8 | 84.5 | 85.0 | 83.4 | 82.6 | 81.0 | 73.5 |
| τ 650 nm, 1 mm | 36.4 | 34.1 | 33.0 | 34.2 | 22.8 | 19.0 | 12.1 | 4.0 |
| α +20/+300×$10^{-7}$/K | 80.2 | 82.9 | 98.4 | 100.0 | 90.2 | 88.5 | 87.9 | 93.4 |
| Weathering resistance (20 days, 40° C., 90% humidity) Δτ 400 nm (before and after climate test) | 1% | 0% | 0.5% | 1% | 1.5% | 1% | 1.8% | |

\* = transmission (including reflection losses)

In the preceding table, the commas are decimal points

The preceding examples can be repeated with-similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A substantially color-neutral, CuO-containing aluminophosphate glass having a low transmission in the infrared range and a substantially higher transmission in the near UV and visible ranges, consisting essentially of in % by weight of an oxide basis:

| | | | | |
|---|---|---|---|---|
| $P_2O_5$ | 67–77 | MgO | 2.5–4.9 | |
| $Al_2O_3$ | 8–13 | CaO | 0–2.5 | |
| $B_2O_3$ | 0–5.5 | SrO | 0–2.5 | |
| $SiO_2$ | 0–2.1 | BaO | 0–2.5 | |
| $Li_2O$ | 0–2.5 | ZnO | 0–2.5 | |
| $Na_2O$ | 0–6 | ΣRO | <5 | |
| $K_2O$ | 0–14 | CuO | 2–7.5 | |
| $Rb_2O$ | 0–2.5 | $V_2O_5$ | 0.001–0.5 | |
| $Cs_2O$ | 0–2.5 | ΣCuO + $V_2O_5$ | 2–7.5 | |
| $ΣR_2O$ | 0–14 | | | | wherein $ΣR_2O$ is the sum of all alkali metal oxides and ΣRO is the sum of ZnO and all alkaline earth metal oxides.

2. An aluminophosphate glass according to claim 1, wherein the content of $P_2O_5$ is 69–75% by weight.

3. An aluminophosphate glass according to claim 1, wherein the content of $K_2O$ is 0.2–12% by weight.

4. An aluminophosphate glass according to claim 2, wherein the content of $K_2O$ is 0.2–13% by weight.

5. An aluminophosphate glass according to claim 1, wherein the content of alkaline earth metal oxides and ZnO are:

| MgO | 2.8–4.8 | wt. % |
|---|---|---|
| CaO | 0–2 | wt. % |
| SrO | 0–1.5 | wt. % |
| BaO | 0–2.2 | wt. % |
| ZnO | 0–1.5 | wt. %. |

6. An aluminophosphate glass according to claim 2, wherein the content of alkaline earth metal oxides and ZnO are:

| MgO | 2.8–4.8 | wt. % |
|---|---|---|
| CaO | 0–2 | wt. % |
| SrO | 0–1.5 | wt. % |
| BaO | 0–2.2 | wt. % |
| ZnO | 0–1.5 | wt. %. |

7. An aluminophosphate glass according to claim 3, wherein the content of alkaline earth metal oxides and ZnO are:

| MgO | 2.8–4.8 | wt. % |
|---|---|---|
| CaO | 0–2 | wt. % |
| SrO | 0–1.5 | wt. % |
| BaO | 0–2.2 | wt. % |
| ZnO | 0–1.5 | wt. %. |

8. An aluminophosphate glass according to claim 4, wherein the content of alkaline earth metal oxides and ZnO are:

| MgO | 2.8–4.8 | wt. % |
|---|---|---|
| CaO | 0–2 | wt. % |
| SrO | 0–1.5 | wt. % |
| BaO | 0–2.2 | wt. % |
| ZnO | 0–1.5 | wt. %. |

9. An aluminophosphate glass according to claim 1, further comprising at least one of the following

| $CeO_2$ | 0–3.0 | wt. % |
|---|---|---|
| $MnO_2$ | 0–3.0 | wt. % |
| $Cr_2O_3$ | 0–0.5 | wt. % | but totaling more than zero and no more than 5.5% by weight.

10. An aluminophosphate glass according to claim 8, further comprising at least one of the following

| $CeO_2$ | 0–3.0 | wt. % |
|---|---|---|
| $MnO_2$ | 0–3.0 | wt. % |
| $Cr_2O_3$ | 0–0.5 | wt. % | but totaling more than zero and no more than 5.5% by weight.

11. An aluminophosphate glass according to claim 1, further comprising at least one of the following

| $As_2O_3$ | 0–0.3 | wt. % |
|---|---|---|
| $Sb_2O_3$ | 0–0.3 | wt. % |
| $SO_3$ | 0–0.3 | wt. % |

| -continued | |
|---|---|
| halide (Cl, F) | 0–0.5 wt. % | but totaling more than zero and no more than 0.8% by weight.

12. An aluminophosphate glass according to claim 1, wherein the content of $SiO_2$ is 0.2–2% by weight.

13. An aluminophosphate glass according to claim 5, content of $SiO_2$ is 0.2–2% by weight.

14. An aluminophosphate glass according to claim 8, wherein the content of $SiO_2$ is 0.2–2% by weight.

15. An aluminophosphate glass according to claim 1, wherein the content of $V_2O_5$ is 0.001–0.1% by weight.

16. An aluminophosphate glass according to claim 5, the content of $V_2O_5$ is 0.001–0.1% by weight.

17. An aluminophosphate glass according to claim 8, wherein the content of $V_2O_5$ is 0.001–0.1% by weight.

18. An aluminophosphate glass according to claim 14, wherein the content of $V_2O_5$ is 0.001–0.1% by weight.

19. An aluminophosphate glass according to claim 1, wherein the content of $V_2O_5$ is 0.001–0.05% by weight.

20. An aluminophosphate glass according to claim 1, having the following properties:

transmission (including reflecting losses), measured on 1 mm thick speciments at 400 nm, of about 72.5–86.2; at 550 nm, about 81.0–86.8; and at 650 nm, about 12.1–36.4.

* * * * *